Dec. 30, 1947.   R. I. LONGLEY, JR   2,433,614
NICKEL CATALYST AND METHOD OF PREPARING IT
Filed May 11, 1943
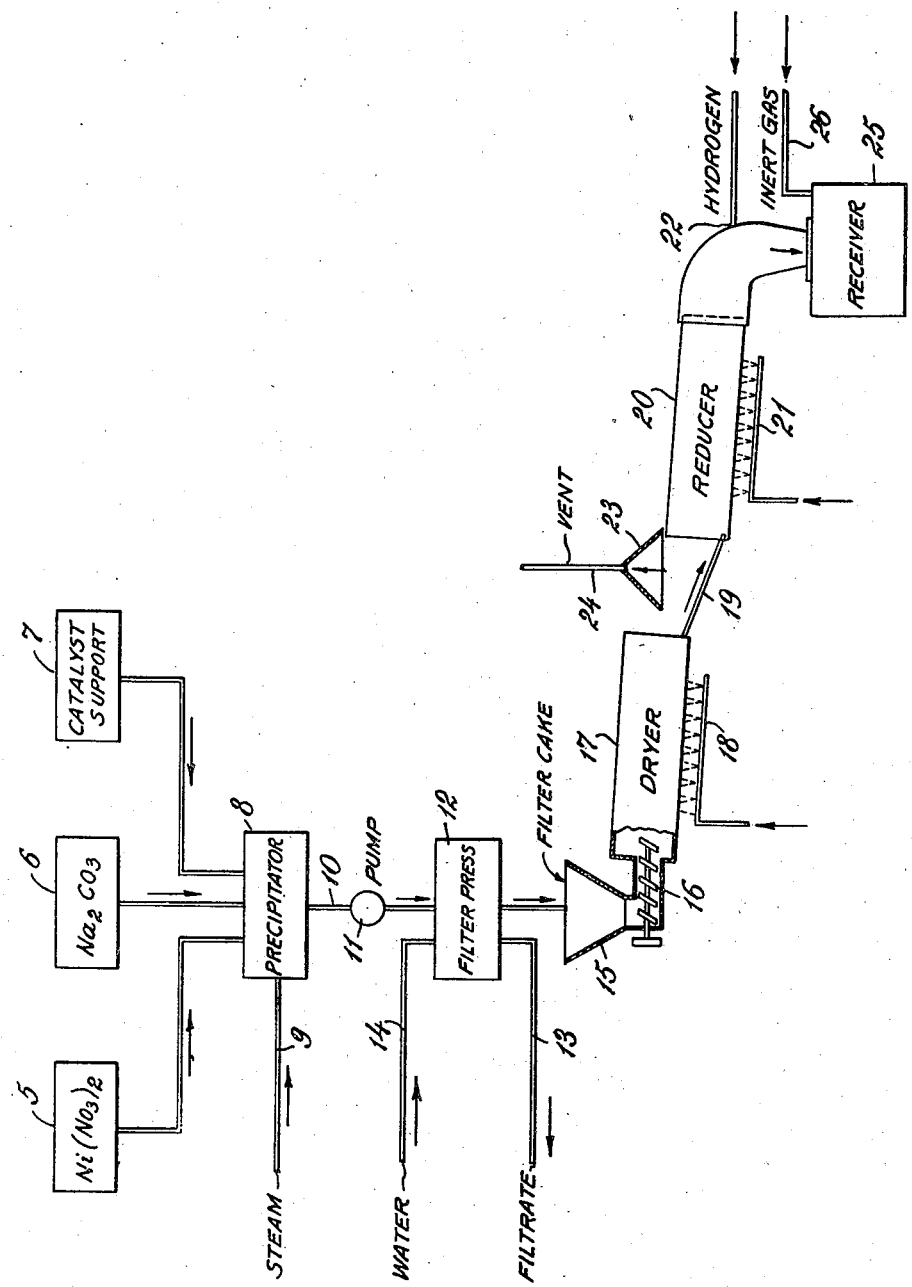
INVENTOR.
Raymond I. Longley Jr.
BY
ATTORNEYS Patented Dec. 30, 1947

2,433,614

UNITED STATES PATENT OFFICE 2,433,614

NICKEL CATALYST AND METHOD OF PREPARING IT

Raymond I. Longley, Jr., Stamford, Conn., assignor to Air Reduction Company, Incorporated, New York, N. Y., a corporation of New York Application May 11, 1943, Serial No. 486,513

3 Claims. (Cl. 252—207)

This invention relates to the catalytic hydrogenation of aldol to produce 1,3-butylene glycol and particularly to an improved nickel catalyst for use in the hydrogenation reaction and a method of preparing the catalyst.

The catalyst is especially adapted for use in the continuous conversion of aldol by hydrogenation as described in the application of Frederick R. Balcar, Ser. No. 479,771, filed March 19, 1943, now U. S. Patent No. 2,421,451, issued June 3, 1947. This application describes a procedure in which a mixture of aldol and a reduction catalyst flows in the presence of hydrogen under elevated pressure through a succession of chambers, the reaction product being withdrawn continuously from the final chamber and separated from the catalyst.

In such an operation conducted at a temperature preferably not exceeding 100° C., and more often as low as 75° C., it is essential that the catalyst be very active. Moreover, the catalyst should be of such physical nature as to permit easy separation on standing from the reduction product. Nevertheless it must be sufficiently finely divided to present adequate surface in order to maintain the desired rate of reduction.

It is the object of the present invention to provide a novel and active catalyst adapted for use in the hydrogenation of aldol and a simple and efficient method of preparing such a catalyst.

Other objects and advantages of the invention will be apparent as it is better understood by reference to the following specification and accompanying drawing consisting of a flow sheet indicating the preferred procedure in the preparation of the catalyst.

I have discovered that a very active catalyst for the reaction can be prepared by supporting a reducible nickel salt upon a carrier such as a finely-divided natural bentonite which has been treated with sulphuric acid and thereafter subjected to a heat treatment, and subsequently reducing the nickel compound in such a manner that it is exposed to the reducing atmosphere for only a short interval of time. The resulting catalyst consists of active nickel disposed upon the supporting material and it has proved most effective in the catalytic hydrogenation of aldol.

The carrier upon which the nickel is deposited consists largely of silica and alumina with smaller proportions of magnesium, calcium and iron. It also may contain small amounts of titanium, sodium, potassium and manganese. A characteristic analysis after drying at 110° C. is:

| | |
|---|---|
| $SiO_2$ | 67.83 |
| $Al_2O_3$ | 15.82 |
| $MgO$ | 4.31 |
| $CaO$ | 2.15 |
| $Fe_2O_3$ | 2.31 |
| $Na_2O+K_2O$ | 0.41 |
| $TiO_2$ | 0.35 |
| Combined water and volatiles | 5.11 |

As the preferred method of preparing the catalyst, 75 pounds of nickel nitrate $Ni(NO_3)_2.6H_2O$ are dissolved in 20 gallons of hot water and the resulting solution is added with stirring to a solution of 27.5 pounds of sodium carbonate dissolved in thirty gallons of hot water. 15 pounds of the carrier are then added and the whole mass well agitated. The mixture may advantageously be kept hot during this agitation by the introduction of a current of steam. The sodium carbonate reacts with the nickel nitrate to form nickel carbonate—usually a mixture of the pure carbonate and the basic carbonate which deposits on the suspended carrier. The mixture is then filtered and washed with hot water until substantially free from water soluble materials. The filter cake is then dried at 100°–450° C., and is reduced by means of hydrogen at 450°–600° C. The reduction is conducted so that the material is exposed to the reducing atmosphere for only a short period of time, as a rule not over 10 minutes and preferably about 1–5 minutes. The finished catalyst contains about 50% by weight of nickel when the above proportions are used. While nickel nitrate is preferably used in the preparation of the catalyst, other nickel salts such as the sulphate or chloride may be used.

In the commercial preparation of the catalyst, the procedure indicated in the accompanying drawing may be followed. 5, 6 and 7 indicate respectively receptacles for nickel nitrate, sodium carbonate and the carrier. These materials in the proper proportions are fed to the precipitator 8 which is supplied with steam as indicated at 9. The resulting suspension is delivered through a pipe 10 and pump 11 to a filter press 12, the filtrate being withdrawn through a pipe 13. Water for washing is introduced through a pipe 14. The cake from the filter press is delivered to a hopper 15 and introduced by a conveyor 16 to a dryer 17, preferably of cylindrical type, which may be heated to the required temperature by combustible gas supplied to a burner 18. After drying, the material is delivered through a chute 19 to the reducing furnace 20, also preferably of the rotating cylindrical type, heated by combustible gas supplied to the burner 21. Hydrogen as the reducing agent is supplied through a pipe 22 and is withdrawn through a head 23 and vent pipe 24. The reduced product is delivered to a receiver 25 which is supplied with an inert gas through a pipe 26 to prevent contact of the atmosphere with the finished catalyst. The catalyst may be withdrawn as required and supplied to the reaction.

The improved catalyst prepared in the manner described is remarkably active as is shown by the fact that when aldol was reduced at 100° C. under 300 pounds per square inch pressure of hydrogen and in the presence of 2% by weight of nickel mounted on the carrier, the percentage reduction of the aldol at the end of 30 and 60 minutes was respectively 85% and 98.6%. While the life of most nickel catalysts in this reaction is short, the catalyst described herein has shown very considerable improvement. It has been possible to use it successively for four separate reductions of aldol before the activity has been so impaired as to necessitate revivification. In each case the catalyst was separated from the 1,3-butylene glycol by settling and decantation. Fresh aldol was added and the hydrogenation continued. The catalyst moreover lends itself readily to revivification in the manner described in the Balcar application above identified. The spent catalyst is washed with water to free it from adhering glycol, dried, ground to disintegrate the cake formed by drying and then reduced under the conditions set forth above for the preparation of new catalyst. After such revivification, the catalyst was found to have regained substantially all of its original activity.

Various changes may be made in the procedure and in the apparatus as described without departing from the invention or sacrificing the advantages thereof.

I claim:

1. An improved aldol-hydrogenation catalyst consisting essentially of a finely-divided mineral acid-activated bentonite impregnated with about 50% by weight of the total catalyst of the nickel product derived by subjecting a nickel carbonate deposited thereon to a hydrogen-reducing atmosphere at a temperature of about 450° C. to 600° C. for a period from about 1 to 10 minutes.

2. The method of preparing an aldol-hydrogenation catalyst comprising depositing a nickel carbonate on a finely-divided acid-treated bentonite, and subjecting the bentonite with the nickel carbonate deposited thereon to a hydrogen-reducing atmosphere at a temperature of about 450° C. to 600° C. for a period of from about 1 to 10 minutes to effect reduction of the nickel carbonate.

3. The method of preparing a catalyst as set forth in claim 2 in which the nickel carbonate is subjected to the hydrogen-reducing atmosphere for a period of from 1 to 5 minutes.

RAYMOND I. LONGLEY, Jr.

REFERENCES CITED

The following references are of record in the file of this patent:

UNITED STATES PATENTS

| Number | Name | Date |
| --- | --- | --- |
| 2,040,233 | Adkins | May 12, 1936 |
| 1,282,296 | Schwarcman | Oct. 22, 1918 |
| 1,695,666 | Schirmacker et al. | Dec. 18, 1928 |
| 1,775,366 | Joseph | Sept. 9, 1930 |
| 2,083,895 | Connolly | June 15, 1937 |
| 2,330,685 | Connolly | Sept. 28, 1943 |
| 2,309,263 | Thomas | Jan. 26, 1943 |
| 2,330,098 | Watts | Sept. 21, 1943 |
| 2,333,500 | Welty | Nov. 2, 1943 |
| 1,695,447 | Woodruff et al. | Dec. 18, 1928 |
| 1,427,037 | Teichner | Aug. 22, 1922 |
| 1,339,686 | Boyce | May 11, 1920 |
| 1,093,377 | Boberg | Apr. 14, 1914 |
| 2,365,029 | Voorhies, Jr. | Dec. 12, 1944 |
| 2,398,899 | Teter | Apr. 23, 1946 |

OTHER REFERENCES

Dana, Text Book of Mineralogy, revised by Ford, 1922, pages 578 and 579.

Berkman et al., "Catalysis," Reinhold Pub. Co., N. Y., 1940, page 478.

U. S. Bureau of Mines Technical Paper 609, 1940, page 12.